(12) United States Patent
Zhou

(10) Patent No.: US 9,645,296 B2
(45) Date of Patent: May 9, 2017

(54) LIGHT GUIDE PLATE AND A BACKLIGHT MODULE

(71) Applicant: Shenzhen China Star Optoelectronics Technology Co., Ltd., Shenzhen, Guangdong (CN)

(72) Inventor: Gege Zhou, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 136 days.

(21) Appl. No.: 14/426,748

(22) PCT Filed: Jan. 4, 2015

(86) PCT No.: PCT/CN2015/070065
§ 371 (c)(1),
(2) Date: Mar. 7, 2015

(87) PCT Pub. No.: WO2016/082307
PCT Pub. Date: Jun. 2, 2016

(65) Prior Publication Data
US 2016/0341865 A1    Nov. 24, 2016

(30) Foreign Application Priority Data

Nov. 26, 2014  (CN) .......................... 2014 1 0693229

(51) Int. Cl.
*F21V 8/00*  (2006.01)
(52) U.S. Cl.
CPC ............. *G02B 6/002* (2013.01); *G02B 6/005* (2013.01); *G02B 6/0045* (2013.01)

(58) Field of Classification Search
CPC ....... G02B 6/0045; G02B 6/005; G02B 6/002
See application file for complete search history.

(56) References Cited

U.S. PATENT DOCUMENTS

| 8,517,591 | B2* | 8/2013 | Nakamoto | G02B 6/0046 362/617 |
|---|---|---|---|---|
| 8,931,943 | B2* | 1/2015 | Kunimochi | G02B 6/0011 362/609 |
| 2004/0109306 | A1* | 6/2004 | Lee | G02B 6/002 362/615 |
| 2010/0195019 | A1* | 8/2010 | Shinohara | G02B 6/0016 349/62 |
| 2010/0328580 | A1* | 12/2010 | Kim | G02B 6/0073 349/64 |

(Continued)

*Primary Examiner* — Elmito Breval
(74) *Attorney, Agent, or Firm* — Andrew C. Cheng

(57) ABSTRACT

The present invention discloses a light guide plate, comprises a light inducing portion closed to the light incident side and a main body portion away from the light incident side, the top surface on the main body portion is the light exiting surface, the light inducing portion is thicker than the main body portion, and the first angle between the light exiting surface and the connecting surface of the light inducing portion and the main body portion is an obtuse angle. In the light guide plate of the present invention, the light guide portion close to the light incident side is thicker than the main body portion, the light source utilization is increased, the light guide effect is enhanced, the light guide efficiency and the optical taste of the backlight module which contains the ultra-thin light guide plate are all improved.

12 Claims, 1 Drawing Sheet

(56) References Cited

U.S. PATENT DOCUMENTS

| | | | |
|---|---|---|---|
| 2012/0002437 A1* | 1/2012 | Yabe | G02B 6/0028 362/606 |
| 2012/0188482 A1* | 7/2012 | Lee | G02B 6/002 349/62 |
| 2013/0141935 A1* | 6/2013 | Huang | G02B 6/002 362/602 |
| 2014/0176876 A1* | 6/2014 | Shinohara | G02B 6/002 349/65 |
| 2015/0219817 A1* | 8/2015 | Kim | G02B 6/004 362/607 |

* cited by examiner

LIGHT GUIDE PLATE AND A BACKLIGHT MODULE

FIELD OF THE INVENTION

The invention relates to a light guide technology field, in particular to a light guide plate and a backlight module.

THE RELATED ARTS

Nowadays, a liquid crystal display as a display portion of an electronic equipment has been widely used in various electronic products, frames of these electronic products are more narrow, brightness criteria are higher, and further to meet the requirement of energy saving demand simultaneously; the backlight module is an important portion in the liquid crystal display, and a optical taste demand of consumers is increasing.

In general situation, a light guide plate is disposed within a side-edge backlight module and a LED light source assembly is disposed at a side of the light guide plate, and due to a ultra-thin design of the liquid crystal equipment and a consideration of decreasing cost, the thickness of the light guide plate within the backlight module is performed thinning process on design. However, a size in matching the LED light source assembly cannot be made thinner and light emitting angel from the LED light source assembly is fixed, so that a utilization of light source is low because a huge part of light emitted from the LED light source assembly is not able to emit into the light guide plate; at the meantime, a light guide efficiency is decreasing a lot and a backlight efficiency is reducing greatly because of the light guide plate after thinning.

SUMMARY

In view of the deficiencies present in the prior art, the invention provides a light guide plate and a backlight module with high light source utilization, high light guide efficiency and good backlight efficiency.

In order to achieve the above objects, the present invention adopts the following technical solution:

A light guide plate, wherein, comprises a light inducing portion closed to the light incident side and a main body portion away from the light incident side, the top surface on the main body portion is the light exiting surface, the light inducing portion is thicker than the main body portion, and the first angle between the light exiting surface and the connecting surface of the light inducing portion and the main body portion is an obtuse angle.

Wherein, two side walls of the main body portion adjacent to the connecting surface are disposed inclined relative to the light exiting surface, and the second angle between the side walls and the light exiting surface is an obtuse angle.

Wherein, another side wall of the main body portion adjacent to the connecting surface is disposed inclined relative to the light exiting surface, and the third angle between the another side wall and the light exiting surface is an obtuse angle.

Wherein, the first angle ranges between 120° and 150°.
Wherein, the second angle ranges between 90° and 150°.
Wherein, the third angle ranges between 90° and 150°.
Wherein, the connecting surface is a light shielding surface.

Or, the connecting surface is a reflective surface.

Meanwhile, the present invention further provides a backlight module, comprising the above light guide plate, a LED light source assembly disposed at the light incident side of the light guide plate and optical films disposed at the light exiting surface of the light guide plate.

In the light guide plate of the present invention, the light guide portion close to the light incident side is thicker than the main body portion, the light source utilization is increased, the light guide effect is enhanced, the light guide efficiency and the optical taste of the backlight module which contains the ultra-thin light guide plate are all improved.

DETAILED DESCRIPTION OF THE EMBODIMENTS

To make the objects, technical solutions and advantages of the present invention will be more clearly understood, the accompanying drawings and the following embodiments of the present invention will e described in more detail. It should be understood that the specific embodiment described herein are merely to illustrate the invention and are not intended not limited the present invention.

Figure 1:
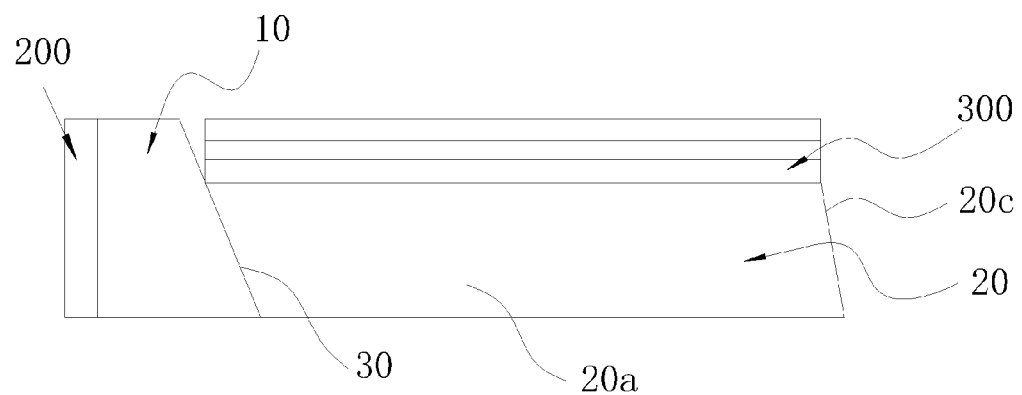
FIG. 1 is a structural schematic diagram of the backlight module of an embodiment of the present invention.
Figure 2:
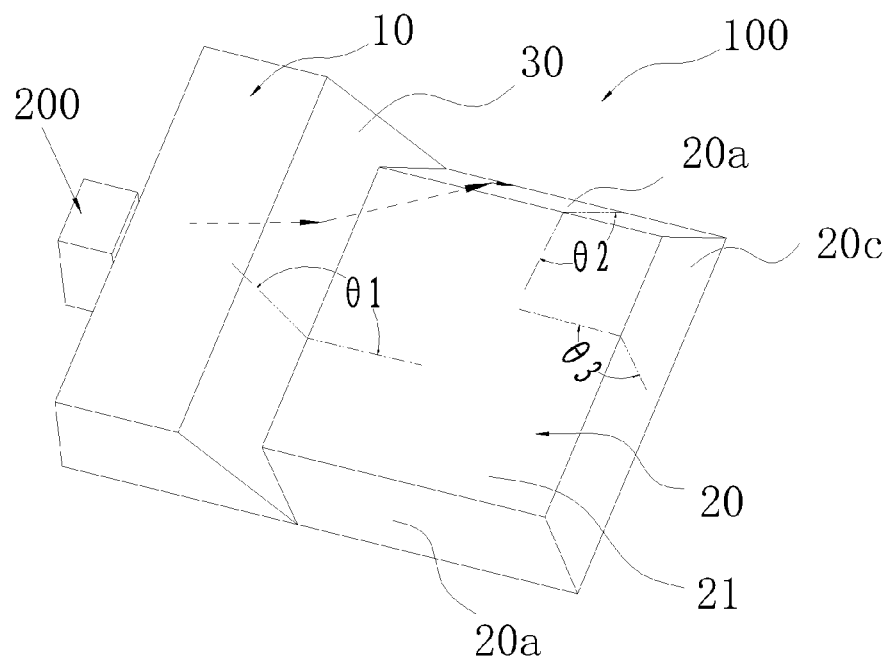
FIG. 2 is a structural schematic diagram of the light guide plate of the embodiment of the present invention.

Please refer to FIG. 1 and FIG. 2, a backlight module of a embodiment in the present invention comprises a light guide plate 100, a LED light source assembly 200 disposed at the light incident side of the light guide plate 100 and optical films 300 disposed at the light exiting surface 21 of the light guide plate 100. To achieve backlight, light emitted to the optical films 300 from the LED light source assembly 200 emits from the light exiting surface 21 of a top surface on the light guide plate 100 after passing through the light guide plate 100.

A light guide plate 100 comprises a light inducing portion 10 closed to the light incident side and a main body portion 20 away from the light incident side, wherein, the top surface on the main body portion is the light exiting surface 21, a light inducing portion 10 is thicker than the main body portion 20, and the first angle θ1 between the light exiting surface 21 and a connecting surface 30 which is between the light inducing portion 10 and the main body portion 20 is an obtuse angle. The first angle ranges better between 120° and 150°.

Because the light inducing portion 10 is thicker than the main body portion 20, facilitating to house light emitted from the LED light source assembly 200 to avoid low light utilization phenomenon due to light emitted from the LED light source assembly 200 cannot be able to all inject into the light guide plate 100 because of a over-small size of the light incident side of a ultra-thin light guide plate 100, and facilitating ultra-thin design of the backlight module and cost reduction.

A back plate or a reflective surface (not shown in the figures) is disposed at a lower surface of the light guide plate is used to reflect light injecting to the lower surface of the light guide plate 100. However, part of the light emitted from the LED light source assembly 200 and then reflected from the lower surface of the light guide plate 100 is reflected to side walls 20a at both sides to eject, so that reduces light exiting efficiency of the light guide plate 100, therefore, both two side walls 20a of the main body portion 20 of the light guide plate 100 in the embodiment adjacent to the connecting surface 30 is disposed inclined relative to the light exiting surface 21, and the second angle θ2 between the side walls 20a and the light exiting surface 21 is an obtuse angle. A light incident angle reflected from both sides of the light guide plate 100 and emitted from the LED light source assembly 200 is increasing, and a light losing reflected at both side walls 20a is reducing through this kind of design. The second angle θ2 ranges better between 90° and 150°, and further, the second angle θ2 is 150° in the embodiment.

Moreover, another side wall 20c of the main body portion 20 adjacent to the connecting surface 30 is disposed inclined relative to the light exiting surface 21, and the third angle θ3 between the side wall 20c and the light exiting surface 21 is an obtuse angle, so that light losing at the side wall 20c is reducing. Wherein, the third angle θ3 ranges between 90° and 150°, and the third angle θ3 is further selected as 150°.

The connecting surface 30 is a light shielding surface or a reflective surface, or is adhered with a light shielding layer or a reflective layer to prevent losing light.

The above contents are only specific implementation modes of the present application, and it should be noted that those skilled in the art can also make some improvements and decorations as long as they are not breaking away from the principle of the present application, and these improvements and decorations should be deemed to be within the scope of protection of the present application.

What is claimed is:

1. A light guide plate, comprises a light inducing portion closed to the light incident side and a main body portion away from the light incident side, the top surface on the main body portion is the light exiting surface, the light inducing portion is thicker than the main body portion, and a first angle between the light exiting surface and the connecting surface of the light inducing portion and the main body portion is an obtuse angle,
   wherein, two side walls of the main body portion adjacent to the connecting surface are disposed inclined relative to the light exiting surface, and a second angle between the side walls and the light exiting surface is an obtuse angle and larger than 90°,
   wherein, another side wall of the main body portion adjacent to the connecting surface is disposed inclined relative to the light exiting surface, and a third angle between the another side wall and the light exiting surface is an obtuse angle and larger than 90°.

2. The light guide plate according to claim 1, wherein, the first angle ranges between 120° and 150°.

3. The light guide plate according to claim 1, wherein, the second angle is smaller than 150°.

4. The light guide plate according to claim 1, wherein, the third angle is smaller than 150°.

5. The light guide plate according to claim 1, wherein, the connecting surface is a light shielding surface.

6. The light guide plate according to claim 1, wherein, the connecting surface is a reflective surface.

7. A backlight module, comprises: a light guide plate, a LED light source assembly disposed at the light incident side of the light guide plate and optical films disposed at the light exiting surface of the light guide plate, wherein, the light guide plate comprises a light inducing portion closed to the light incident side and a main body portion away from the light incident side, the top surface on the main body portion is the light exiting surface, the light inducing portion is thicker than the main body portion, and a first angle between the light exiting surface and the connecting surface of the light inducing portion and the main body portion is an obtuse angle,
   wherein, two side walls of the main body portion adjacent to the connecting surface are disposed inclined relative to the light exiting surface, and a second angle between the side walls and the light exiting surface is an obtuse angle and larger than 90°,
   wherein, another side wall of the main body portion adjacent to the connecting surface is disposed inclined relative to the light exiting surface, and a third angle between the another side wall and the light exiting surface is an obtuse angle and larger than 90°.

8. The backlight module according to claim 7, wherein, the first angle ranges between 120° and 150°.

9. The backlight module according to claim 7, wherein, the second angle is smaller than 150°.

10. The backlight module according to claim 7, wherein, the third angle is smaller than 150°.

11. The backlight module according to claim 7, wherein, the connecting surface is a light shielding surface.

12. The backlight module according to claim 7, wherein, the connecting surface is a reflective surface.

\* \* \* \* \*